March 15, 1960     E. H. HAHN ET AL     2,928,504
HEAVY DUTY OIL-COOLED FRICTION DEVICE
Filed March 12, 1957     4 Sheets-Sheet 1

INVENTORS
EMIL H. HAHN
HONG-JI TSAI

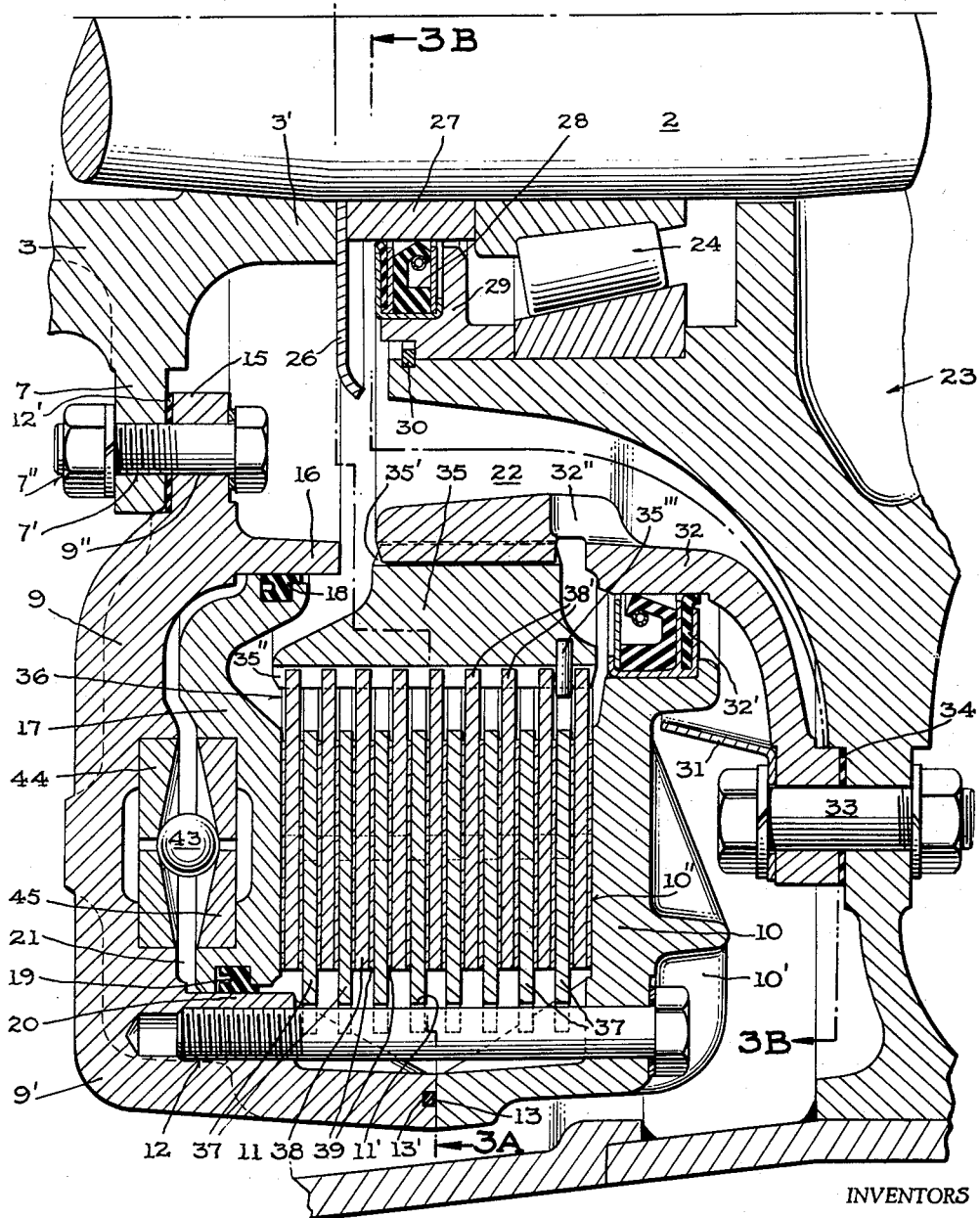

March 15, 1960     E. H. HAHN ET AL     2,928,504
HEAVY DUTY OIL-COOLED FRICTION DEVICE
Filed March 12, 1957     4 Sheets-Sheet 3
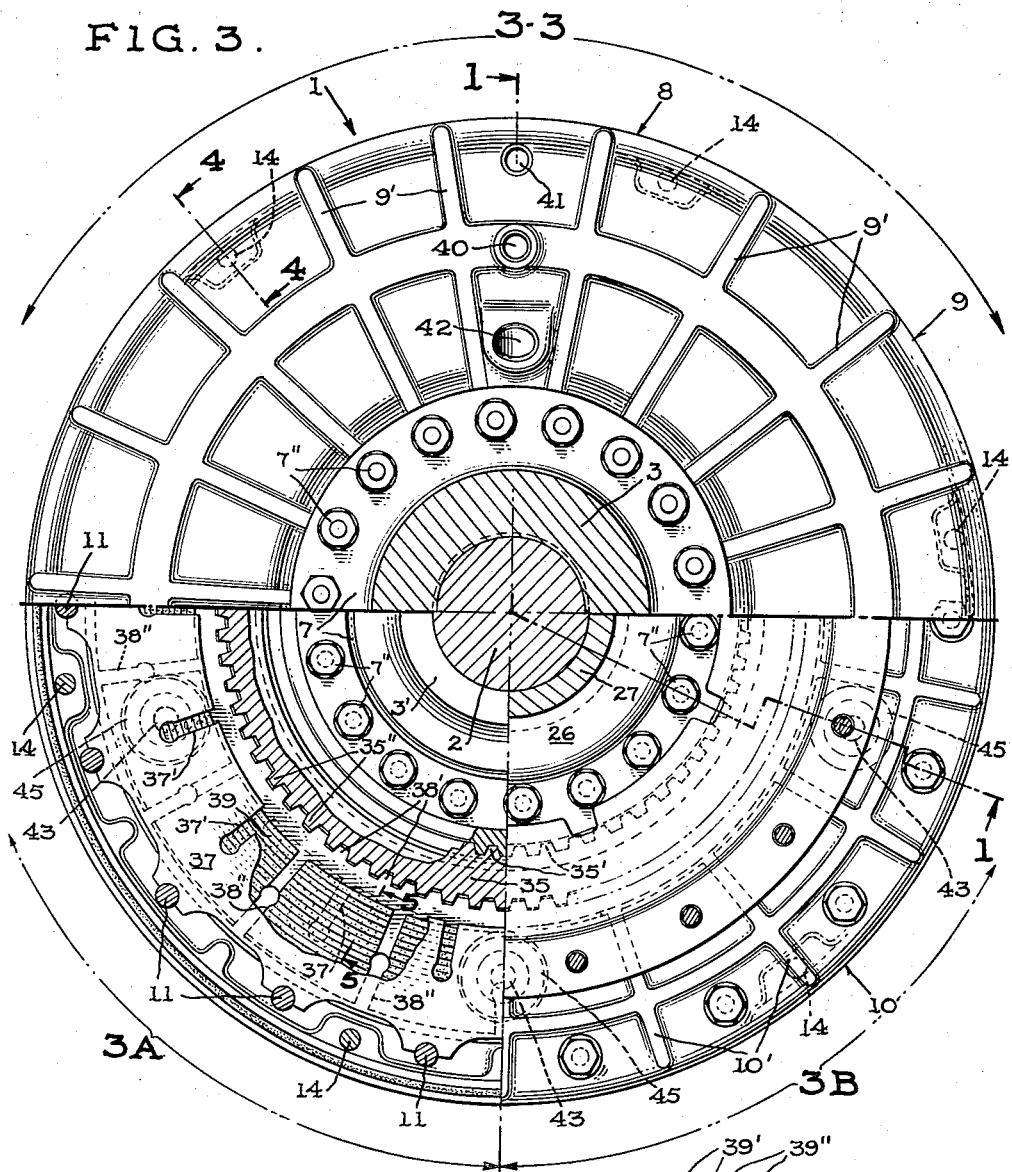
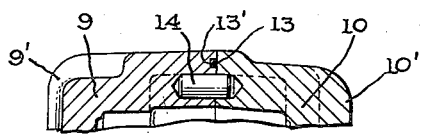
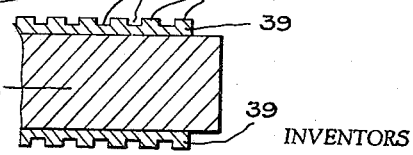
INVENTORS
EMIL H. HAHN
HONG-JI TSAI
BY
ATTORNEYS

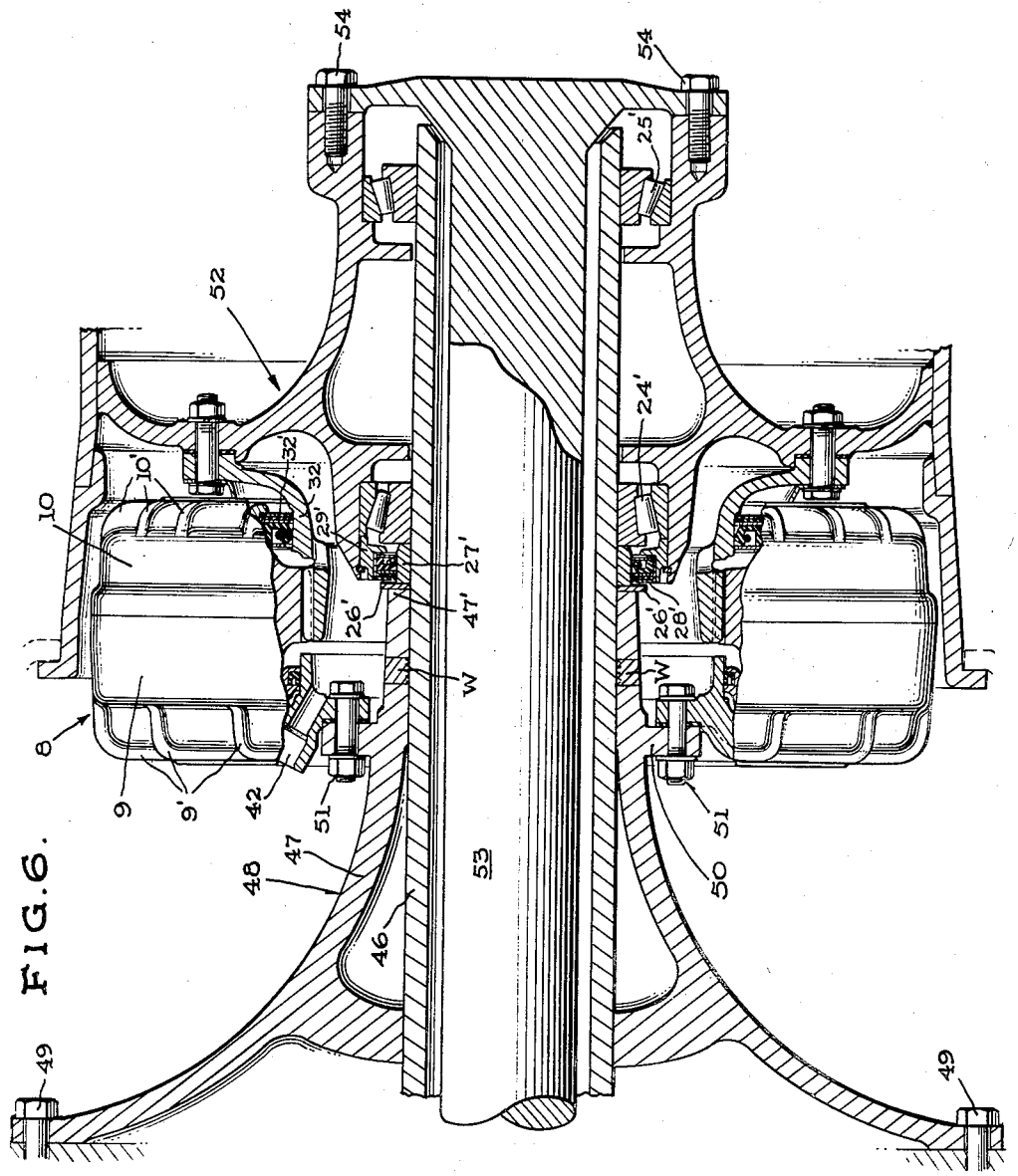

_United States Patent Office_ 2,928,504
Patented Mar. 15, 1960

2,928,504

HEAVY DUTY OIL-COOLED FRICTION DEVICE

Emil H. Hahn, St. Joseph, and Hong-Ji Tsai, Benton Harbor, Mich., assignors, by mesne assignments, to Lambert Brake Corporation, St. Joseph, Mich., a corporation of Michigan Application March 12, 1957, Serial No. 645,623

4 Claims. (Cl. 188—72)

This invention relates to friction devices of the self-energizing or servo-actuated type, and more particularly to fluid operated brakes of this character which are applicable to heavy-duty service, such as for heavy industrial machinery, passenger and freight carrying vehicles of various kinds, and earth-working machinery and equipment used in road construction or other ground-clearing or ground-leveling projects, all of the foregoing including both tractor and trailer type vehicles wherein the heavy loads require brakes which are capable of withstanding severe service conditions.

A common disadvantage of present brake constructions of the type employed in various of the foregoing heavy-duty uses is the tremendous amount of heat generated by repeated brake applications, most of which is retained or trapped within the brake.

A primary object of this invention, therefore, is to provide an improved servo-actuated brake of the multiple disc type that utilizes a combined pneumatic fluid operated and hydraulic fluid cooled construction wherein the extreme heat generated by repeated brake applications is effectively dissipated or reduced to a minimum.

Another object of this invention is to provide an improved and simplified brake construction wherein the usual brake-release compression or expansion type return spring assemblies are eliminated. This is accomplished by utilizing hydraulic fluid pressure to release the brake members, the hydraulic fluid additionally serving the purpose of a coolant to keep the heat factor to a minimum.

A further object of the invention is to provide an improved brake of this class which is simple, compact and sturdy, and which may be operated by either pneumatic or hydraulic fluid pressure, wherein the servo action is developed to an exceptionally high state with a minimum of effort, and together with the improved cooling factor, thereby affords a more effective deceleration of heavy loads.

Other and further objects and advantages of the invention will be hereinafter set forth and the novel features thereof defined in the appended claims.

In the drawings:

Fig. 1 is a vertical cross-sectional view through a brake constructed in accordance with this invention as taken substantially on line 1—1 of Fig. 3 and as applied to a non-rotating axle of a trailer vehicle or the like;

Fig. 2 is an enlarged cross-sectional view of the brake members of this invention as seen in the lower half of Fig. 1;

Figure 1:
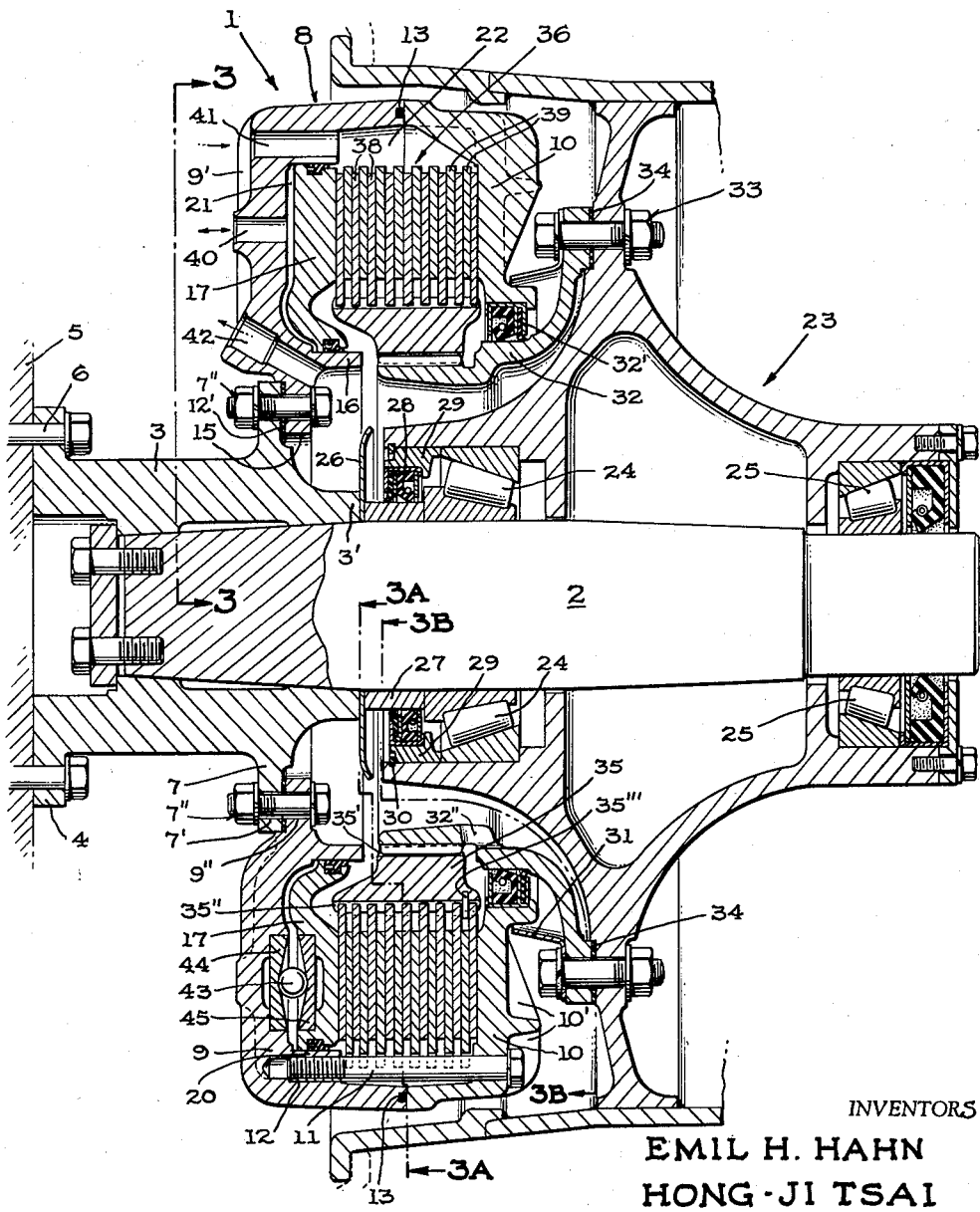

Fig. 3 is a composite inboard side elevation view of the brake of this invention, the upper half being viewed on the line 3—3 of Fig. 1, with the lower half divided into sectional quadrants having some of the parts shown in elevation, the lower left quadrant being a section as viewed substantially on line 3A—3A of Fig. 1 and Fig. 2, while the lower right quadrant is a section as viewed substantially on the line 3B—3B of Fig. 1 and Fig. 2;

Fig. 4 is a fragmentary cross-sectional view as taken on line 4—4 of Fig. 3, showing a detail of one of the dowel pins which is provided to help rigidly maintain the two-part housing in a rigid relationship;

Fig. 5 is an enlarged fragmentary cross-sectional view taken on line 5—5 of Fig. 3, showing the groove and lands detail of one of the sintered lining segments; and Fig. 6 is a vertical cross-sectional view similar to Fig. 1, with some parts shown in elevation, and showing a brake constructed in accordance with this invention as applied to a tractor wheel assembly or the like having a rotating axle shaft.

Like reference characters designate corresponding parts in the several figures of the drawings, wherein for the purpose of illustrating practical embodiments of the invention, the brake in Figs. 1–5 is shown adapted to trailer vehicle usage, whereas Fig. 6 illustrates another practical embodiment of the same brake as adapted to a tractor vehicle.

Referring more particularly to Figs. 1 and 2, the improved brake assembly generally denoted at 1 is shown adapted to trailer vehicle usage wherein a trailer axle shaft 2 is secured to a trailer axle bracket 3 by any suitable means such as keying (not shown). The axle bracket 3 is provided with two spaced annular mounting flanges. The innermost flange 4 serves to secure the bracket 3 to the trailer vehicle frame 5 by suitable means such as bolt assemblies 6, the other flange 7 serving to mount a two-part brake housing 8 of the brake assembly 1.

The two-part brake housing 8 includes an inboard housing member 9 and an outboard housing member 10. The inboard housing member 9 is preferably a generally round plate having an axially extended marginal peripheral flange. The outboard housing member 10 is also preferably a generally round plate with a complemental axially extended marginal peripheral flange which mates with the axially extended flange of the inboard housing section aforesaid. Both housing sections are provided with suitable cooling ribs 9' and 10' respectively. The two-part housing is secured together by means of a plurality of circumferentially spaced threaded tie-bolts 11 engaging in tapped holes 12 of inboard housing section 9. The juncture of the two sections is sealed by means of a housing ring seal 13 that preferably seats in an annular recess 13' in the face of the axially extended peripheral flange of one of the housing sections. Dowel pins 14 may be further provided as shown in Figs. 3 and 4 to rigidly maintain the assembled relationship of the two housing members.

In the illustrated embodiment, the inboard housing section 9 has a plurality of mounting holes 9'' circumferentially spaced about a central aperture 15. Said holes 9'' align with complemental mounting holes 7' in the flange 7 of the axle mounting bracket 3 to receive suitable mounting bolt and nut assemblies 7''. Circumferentially adjacent the aforesaid inner peripheral mounting holes 9'', the inboard housing section 9 is provided with an inwardly axially extended annular flange or hub 16. Said hub 16 is preferably formed concentrically with the axis of axle shaft 2 and serves as a mounting sleeve or bearing on which a primary actuator disc 17 is disposed for both axial and slight rotative movements, to be more fully described hereinafter. Primary actuator disc 17 is a generally flat, ring-shaped disc provided with an annular recess in both its inner and outer peripheral edges in which suitable annular sealing elements 18 and 19 respectively are disposed. The outer periphery of primary disc 17 seats against an annular shoulder 20 formed on the inner periphery of inboard housing member 9, said shoulder 20 being concentric with shoulder 16 and the axis of shaft 2.

The primary actuator disc 17 is disposed so as to effect a bi-chambered division within the housing 8.

The function of the two annular sealing elements 18 and 19, respectively, disposed about the inner and outer peripheries of the primary disc aforesaid is two-fold. They combine to seal a pneumatic pressure fluid, which is used to actuate the brake, in the chamber 21, said chamber being located between the primary actuator disc and the housing section 9, and to further seal a hydraulic fluid which cools and releases the brake components in chamber 22, the principal portion of which is formed between the outboard face of primary disc 17 and the inner face of outboard housing section 10. As illustrated in the drawings, chamber 22 is preferably of considerably larger volume than chamber 21 because it houses more of the operative working parts of the brake.

A freely rotatable trailer wheel assembly generally denoted at 23 is mounted on the shaft 2 with appropriate roller bearing assemblies 24 and 25 disposed therebetween. At the inboard side of said wheel assembly, a splash shield 26 is mounted on the periphery of the axle shaft in abutting engagement between the outer end 3' of the axle bracket 3 and a bearing spacer sleeve 27 which is also mounted on the periphery of the axle shaft, said sleeve 27 serving to hold roller bearing assembly 24 in position within the wheel assembly 23. An oil seal 28 is provided about the outer periphery of bearing sleeve 27 and serves to seal the oil within chamber 22. An oil seal retainer 29 abuts the bearing assembly 24 on one side and is held in place within the inner periphery of the wheel assembly 23 by means of a snap ring 30.

The brake assembly further includes an annular dust shield 31 and a somewhat funnel-shape splined hub member 32, both of which are preferably secured to the inboard side of the rotary wheel assembly 23 by any suitable means such as a plurality of circumferentially spaced bolt and nut assemblies 33, as best seen in Figs. 1 and 2. A flat ring gasket 34 is interposed between said hub member 32 and the wheel assembly 23 to prevent loss of hydraulic pressure and cooling medium as more fully discussed hereinafter. Another oil seal 32' is press-fitted to the inner periphery of the outboard housing section 10 to seal the junction between splined hub 32 and the outboard housing section 10 to also prevent loss of hydraulic pressure and cooling medium and to exclude foreign materials from the brake proper.

The splined hub member 32 preferably has its splines spaced around the outer periphery of its inboard and smaller end, with said splines in turn interengaging complemental splines 35' of an internally splined hub adapter ring 35. The hub adapter ring 35 is also preferably splined about its outer periphery at 35" to permit the carrying of a middle friction disc pack assembly generally denoted 36 which will be hereinafter described in more detail.

At least one pin 35''' is fitted into a suitable hole within the outer periphery of splined hub adapter ring 35, as best seen in Fig. 2, and serves to limit the axial movement of said spindle hub adapter ring within the assembled brake unit, by virtue of the fact that said pin 35''' projects between two of the rotor discs so that the adapter ring 35 can move axially only as fare as the axial movement of the discs of the friction pack.

In order to afford the required or desired friction action in the brake, there is provided between the primary actuator disc 17 and the inner face 10" of outboard housing section 10 the middle friction disc pack assembly 36 aforesaid, comprising a plurality of interleaved stator discs 37 and rotor discs 38, which co-act with themselves and with friction faces on the primary actuator disc and outboard housing section. The intermediate stator discs 37 are generally flat ring-shaped plates with a large central aperture for clearance about the hub adapter ring 35. Provided about the outer periphery of said stator discs are circumferentially spaced semi-circular grooves 11' for slidably seating on the circumferentially spaced tie-bolts 11 which secure the housing sections together. In this manner, said discs are prevented from rotative rotary movement but are free to move axially along said tie-bolts. Rotor discs 38 are alternately disposed relative to the stator discs 37 to compose the friction pack of the middle disc pack assembly 36. Said rotor discs 38 are provided with splines 38' at their inner periphery for complemental slidable inter-engagement with the splines 35" on the outer periphery of the hub adapter ring 35. The rotor discs are thereby disposed for axial movement on the rotatable wheel assembly 23, and rotate with the wheel assembly.

The rotor discs 38 are further preferably provided with a plurality of sintered metallic friction lining segments 39 on the opposed faces thereof as best seen in Figs. 2 and 5, and in quadrant 3A of Fig. 3. Said lining segments are circumferentially spaced apart, thereby affording radial pathways between adjacent segments for the cooling medium to pass through. The lining segments are further preferably provided with concentric grooves 39' and lands 39" which afford greater cooling surfaces for the friction faces of the segments, as shown in the fragmentary cross-section in Fig. 5. The sintered metallic linings have the advantages of insuring effective braking action, high thermal conductivity and long wear of the friction elements of the brake, and thus minimize adjustments or other servicing of the brake.

Both the rotor discs and the stator discs preferably have equally spaced radially extended slots cut therein. As best seen in quadrant 3A of Fig. 3, slidably engageable on tie-bolts 11, a stator disc 37 is shown with a plurality of said slots 37' projecting radially outward from its inner periphery and terminating a little over half way to its outer periphery. Similar slots 38" are cut radially inwardly from the outer periphery of rotor discs 38, which terminate at a point that overlaps the inner terminal of slots 37' in the adjacent stator discs 37. Said slots respectively afford both radial and axial cooling channels through the friction disc pack.

In the illustrative drawings, as best seen in Figs. 1 and 3, the inboard section 9 of the housing 8 is provided with preferably three ports which may be radially aligned one above the other as shown. The middle port 40 serves as the pneumatic fluid inlet-outlet port for chamber 21, while the other two ports 41 and 42 serve respectively as the hydraulic fluid supply and return ports that communicate with chamber 22 which houses the middle disc pack assembly 36 and other brake components.

Disposed between the primary actuator disc 17 and the inner face of the inboard housing section 9, which serves also as a backing or power plate, is a plurality of steel self-energizing balls 43 which seat in oppositely inclined conical inserts 44 and 45. Said inserts are preferably disposed in appropriately provided recesses in the inboard housing section 9 and primary actuator disc 17, respectively.

Any appropriate means may be employed to initiate operation of the brake. An example of one such means is by introducing a pneumatic pressure fluid (to be referred to hereinafter as air) through a suitable conduit (not shown) into port 40. As the air pressure builds up in the air chamber 21 which is sealed by means of annular seals 18 and 19 previously described, the primary actuator disc 17 is forced axially outward until it comes into engagement with the friction lining segments carried by the adjacent rotor disc 38 of the interleaved disc pack assembly 36, consequently engaging all of said interleaved friction disc members and the inner friction surface 10" of outboard housing section 10. As a result of the torque transmitted through the middle disc pack, the primary actuator disc 17 is subjected to considerable drag torque tending to impart rotation thereto from the rotating wheel assembly 23. This tendency of the primary actuator disc 17 to rotate with the wheel assembly causes the balls 43 to climb the low angle ramps of the inserts 44 and 45, and thus create a camming action that results in causing a powerful axial thrust to be exerted by said primary actuator disc against the friction pack assembly and said inner friction surface 10" of the housing, said thrust, in turn being proportionate to the load on the brake, with the resultant braking force generating considerable heat.

Although any suitable hydraulic fluid may be employed, oil is preferably utilized in the illustrative embodiment primarily as a brake coolant and secondarily, although very importantly, as a brake release means. The oil is circulated by a suitable pump through a conduit (neither of which is shown) and then transmitted through the inlet port 41 into the inner chamber 22 which is sealed from the air chamber by seals 18 and 19 and which is effectively sealed against loss of oil pressure and oil coolant by the combined functions of annular oil seals 28 and 32', and gaskes 12', 13' and 34, all of which have been previously described in the foregoing.

The oil surrounds the brake disk pack assembly, flowing through radial and annular concentric slots and grooves in and between adjacent segments of the sintered metallic linings aforesaid, through the slots 37' and 38" of the interleaved stator and rotor discs aforesaid, further cooling the friction members and the central elements of the brake by further circulating through a plurality of circumferentially spaced openings 32" in the splined hub member 32, and returning through outlet port 42 back to the pump to complete the continuous cooling cycle. It is to be understood that the path of the cooling oil circulation may be reversed if desired.

The additional function of the cooling oil is one of prime importance in that the oil may be pumped through the cycle at adequate pressure to effect return of the primary actuator disc 17 to its non-braking position. By so utilizing the oil pressure, the necessity for the usual brake release return spring assemblies is eliminated, thereby greatly simplifying and reducing construction costs thereof.

In the event of oil pressure failure within the system, the brake would merely not disengage fully and thereby would warn the operator of the failure. However, such an oil system would not jeopardize brake application since the brake is actuated by means of air pressure and released by means of oil pressure.

The operation of this invention functions equally effectively in both forward and reverse directions.

The adaptation of this improved brake to various other uses and applications may be easily and inexpensively accomplished, and reference will now be made to Fig. 6, illustrating a practical adaptation of the brake to tractor vehicle usage.

In Fig. 6, a tractor tube 46 and an axle housing 47 are preferably welded as at W and thereby combine to comprise an axle housing assembly 48 which is secured to the chassis by suitable bolts 49. The axle housing member 47 is provided with an annular outwardly projecting flange 50 on which the brake is appropriately mounted by means of a plurality of bolt and nut assemblies 51. in the same fashion as previously described for the trailer embodiment of Figs. 1 to 5.

The brake components contained within the two-part housing 8 are the same as previously described, and therefore need not be repeated in detail.

A tractor wheel assembly generally denoted as 52 and secured to the drive axle 53 by means of bolts 54 is mounted on the tractor tube 46 with appropriate roller bearing assemblies 24' and 25' disposed therebetween. At the inboard side of said wheel assembly, a washer 26' is mounted around the outer periphery of the tractor tube portion 46 of the axle housing assembly 48, in abutting engagement between the outer end 47' of the axle housing 47 and an annular spacer member 27'. Said spacer 27' is mounted on the periphery of the tractor tube 46 and maintains the proper axial position of the roller bearing assembly 24', within the wheel assembly 52.

An appropriate oil seal 28' and oil seal retainer 29' are disposed in similar positions and function in the same manner as their counterparts 28 and 29 respectively, described in the foregoing specification.

The operation and function of the brake of Fig. 6 is the same as described in the foregoing trailer embodiment adaptation and operates equally efficiently in both forward and rearward directions.

While the specific details have been herein shown and described, the invention is not confined thereto as various changes and alterations may be made without departing from the spirit thereof as defined in the appended claims.

We claim:

1. A friction device of the class described, comprising a relatively stationary hollow housing adapted to be removably and sealingly mounted on a support, said housing including separable co-axial spaced inboard and outboard housing plates having abutting sealed peripheral engagement, a plurality of axially movable interleaved stator and rotor friction discs disposed intermediate said housing plates, means for imparting rotation to the rotor discs from a rotary member, a generally flat ring-shaped primary actuator disc disposed for sealed axial and rotative movement between said friction discs and one of said housing plates, said primary actuator disc having both its outer and inner peripheries provided with fluiding contact with concentric axially extended internal bearing surfaces respectively formed on one of the housing plates and thereby sealingly dividing the housing into two chambers, additional means for sealing said chambers against fluid loss, said housing having inlet-outlet means for admitting a pressure fluid into one of said chambers against one side of said primary actuator disc for imparting initial axial movement to said primary disc to effect frictional inter-engagement of said discs and the other housng plate, said housing also having inlet-outlet means for admitting a pressure fluid into the other of said chambers and against the opposite side of said primary disc for commonly cooling and releasing inter-engagement of said friction device to afford a normal running clearance therein, said means for imparting rotary motion to said rotor friction discs including splines on said rotor friction discs, a separate unitary hollow splined hub member inter-engaged with the splines of said rotor friction discs, said separate unitary hollow hub member being removably and sealingly secured to the rotary member, and said separate unitary hollow hub member extending adjacent the inner periphery of one of the housing plates with sealing means interposed therebetween.

2. A friction device of the class described, comprising a relatively stationary hollow housing adapted to be removably and sealingly mounted on a support, said housing including separable co-axial spaced inboard and outboard housing plates having abutting sealed peripheral engagement, a plurality of axially movable interleaved stator and rotor friction discs disposed intermediate said housing plates, means for imparting rotation to the rotor discs from a rotary member, a generally flat ring-shaped primary actuator disc disposed for sealed axial and rotative movement between said friction discs and one of said housing plates, said primary actuator disc having both its outer and inner peripheries provided with fluid-tight seals and disposed for sealed axial and rotative sliding contact with concentric axially extended internal bearing surfaces respectively formed on one of the housing plates and thereby sealingly dividing the housing into two chambers, additional means for sealing said chambers against fluid loss, said housing having inlet-outlet means for admitting a pressure fluid into one of said chambers against one side of said primary actuator disc for imparting initial axial movement to said primary disc to effect frictional inter-engagement of said discs and the other housng plate, said housing also having inlet-outlet means for admitting a pressure fluid into the other of said chambers and against the opposite side of said primary disc for commonly cooling and releasing inter-engagement of said friction device to afford a normal running clearance therein, said means imparting rotary motion to said rotor friction discs including separate splines on said rotor friction discs, a separate unitary hollow splined hub member adapted for operative connection with said splined rotor friction discs, said separate unitary hollow splined hub member being removably and sealingly secured to the rotary member and extending adjacent the inner periphery of one of the housing plates with sealing means interposed therebetween, means for rotatably inter-engaging the splined rotor friction discs with the splined hub member including a separate hollow hub adapter ring disopsed to encircle said hollow hub member and having splined outer and inner peripheries for splined engagement with the splines of the rotor friction discs and with said hollow hub member respectively.

3. A friction device as defined in claim 2, wherein the primary actuator disc is disposed for limited rotative movement responsive to drag torque of the rotary friction disc upon initial engagement of said primary actuator disc with said friction disc, and having self-energizing means disposed between the primary actuator disc and the adjacent housing member for imparting axial thrust to said primary actuator disc responsive to the drag torque aforesaid.

4. A friction device as defined in claim 2, wherein the separate hollow splined hub adaptor ring is disposed for limited axial movement relative to said friction discs and to the separate unitary hollow hub member, a limit pin carried by said hub adapter ring and projecting between an adjacent pair of said rotor friction discs for limiting axial movement of the adapter ring as aforesaid.

References Cited in the file of this patent

UNITED STATES PATENTS

| | | |
|---|---|---|
| 2,015,729 | Robbins | Oct. 1, 1935 |
| 2,240,219 | Lambert | Apr. 29, 1941 |
| 2,375,855 | Lambert | May 15, 1945 |
| 2,517,973 | Cardwell et al. | Aug. 8, 1950 |
| 2,518,016 | Johnson et al. | Aug. 8, 1950 |
| 2,690,248 | McDowall | Sept. 28, 1954 |
| 2,788,870 | Heck | Apr. 16, 1957 |
| 2,816,630 | Kelley et al. | Dec. 17, 1957 |
| 2,823,770 | Helvern | Feb. 18, 1958 |

FOREIGN PATENTS

| | | |
|---|---|---|
| 739,244 | Great Britain | Oct. 26, 1955 |

UNITED STATES PATENT OFFICE
CERTIFICATE OF CORRECTION

Patent No. 2,928,504                                                      March 15, 1960

Emil H. Hahn et al.

It is hereby certified that error appears in the printed specification of the above numbered patent requiring correction and that the said Letters Patent should read as corrected below.

Column 6, line 17, for "co-axial" read -- co-axially --; line 26, after "with fluid-" insert -- tight seals and disposed for sealed axial and rotative slide- --; line 54, for "co-axial" read co-axially --; column 7, line 4, after "means" insert -- for --; lines 5 and 6, strike out "separate"; line 15, for "disoped" read -- disposed --.

Signed and sealed this 2nd day of August 1960.

(SEAL)
Attest:

KARL H. AXLINE
Attesting Officer

ROBERT C. WATSON
Commissioner of Patents